(12) United States Patent
Daulton et al.

(10) Patent No.: US 12,251,757 B2
(45) Date of Patent: Mar. 18, 2025

(54) ADAPTIVELY DEPOSITING BRAZE MATERIAL(S) USING CT SCAN DATA

(71) Applicant: Pratt & Whitney Canada Corp., Longueuil (CA)

(72) Inventors: Charles Trent Daulton, Burkburnett, TX (US); Kevin M. Tracy, Wichita Falls, TX (US)

(73) Assignee: Pratt & Whitney Canada Corp., Longueuil (CA)

( * ) Notice: Subject to any disclaimer, the term of this patent is extended or adjusted under 35 U.S.C. 154(b) by 31 days.

(21) Appl. No.: 17/942,057

(22) Filed: Sep. 9, 2022

(65) Prior Publication Data

US 2024/0082919 A1 Mar. 14, 2024

(51) Int. Cl.
*B22F 10/28* (2021.01)
*B22F 10/85* (2021.01)
*B33Y 10/00* (2015.01)
*B33Y 30/00* (2015.01)
*B33Y 50/02* (2015.01)

(52) U.S. Cl.
CPC .............. *B22F 10/28* (2021.01); *B22F 10/85* (2021.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 8,140,179 B2 | 3/2012 | Drechsler | |
| 8,910,361 B2 | 12/2014 | Rickenbacher | |
| 9,174,312 B2 | 11/2015 | Baughman | |
| 9,505,172 B2 | 11/2016 | Ljungblad | |
| 9,764,517 B2 | 9/2017 | Potter | |
| 9,902,024 B2 | 2/2018 | Ernst | |
| 10,174,414 B2 | 1/2019 | Lin | |
| 10,814,439 B2 | 10/2020 | Ozturk | |
| 11,097,350 B2 | 8/2021 | Twelves, Jr. | |
| 11,285,538 B2 | 3/2022 | Shi | |
| 11,305,353 B2 | 4/2022 | Geisen | |
| 2006/0163323 A1 | 7/2006 | Pietruska | |

(Continued)

FOREIGN PATENT DOCUMENTS

| | | |
|---|---|---|
| DE | 102019203796 A1 | 9/2020 |
| EP | 3933527 A1 | 1/2022 |

(Continued)

OTHER PUBLICATIONS

EP Search Report for EP Patent Application No. 23196279.6 dated Feb. 7, 2024.

*Primary Examiner* — Anthony M Liang
(74) *Attorney, Agent, or Firm* — Getz Balich LLC

(57) ABSTRACT

A method is disclosed for providing a component. During this method, a substrate is scanned using computed tomography to provide substrate scan data. The substrate scan data is compared to substrate reference data to provide additive manufacturing data. Braze powder is deposited with the substrate based on the additive manufacturing data. The braze powder is sintered together during the depositing of the braze powder to provide the substrate with sintered braze material. The sintered braze material is heated to melt the sintered braze material and to diffusion bond the sintered braze material to the substrate.

20 Claims, 4 Drawing Sheets

(56) References Cited

U.S. PATENT DOCUMENTS

| | | |
|---|---|---|
| 2007/0228108 A1 | 10/2007 | Goldschmidt |
| 2008/0173624 A1* | 7/2008 | Drechsler ............... F01D 5/005 |
| | | 219/137 R |
| 2009/0026182 A1 | 1/2009 | Hu |
| 2015/0217415 A1 | 8/2015 | Andolfi |
| 2016/0167172 A1* | 6/2016 | Goncharov .......... B23K 35/304 |
| | | 219/76.1 |
| 2018/0243866 A1 | 8/2018 | Srinivasan |
| 2018/0281125 A1 | 10/2018 | Burbaum |
| 2019/0299290 A1 | 10/2019 | Kuhns |
| 2021/0069832 A1* | 3/2021 | Burbaum ........... B23K 35/3046 |
| 2021/0146433 A1* | 5/2021 | Shuck .................. C22C 1/0433 |
| 2021/0299802 A1 | 9/2021 | Shin |
| 2022/0212396 A1 | 7/2022 | Tardif |
| 2022/0212397 A1 | 7/2022 | Edy |

FOREIGN PATENT DOCUMENTS

| | | |
|---|---|---|
| FR | 3103401 B1 | 7/2023 |
| JP | 2009025119 A | 2/2009 |
| JP | 2010207884 A | 9/2010 |
| WO | 2015161980 A1 | 10/2015 |
| WO | 2019177607 A1 | 9/2019 |

\* cited by examiner

ADAPTIVELY DEPOSITING BRAZE MATERIAL(S) USING CT SCAN DATA

TECHNICAL FIELD

This disclosure relates generally to manufacturing a component using additive manufacturing.

BACKGROUND INFORMATION

Defects in a component may be overhauled using braze material or weld filler. Various processes are known in the art for applying braze material and for welding filler material to a component. While these known processes have various advantages, there is still room in the art for improvement. In particular, there is a need in the art for overhaul processes which can reduce material waste and/or decrease formation of secondary (process related) defects in a substrate of the component.

SUMMARY

According to an aspect of the present disclosure, a method is disclosed for providing a component. During this method, a substrate is scanned using computed tomography to provide substrate scan data. The substrate scan data is compared to substrate reference data to provide additive manufacturing data. Braze powder is deposited with the substrate based on the additive manufacturing data. The braze powder is sintered together during the depositing of the braze powder to provide the substrate with sintered braze material. The sintered braze material is heated to melt the sintered braze material and to diffusion bond the sintered braze material to the substrate.

According to another aspect of the present disclosure, another method is disclosed for providing a component. During this method, a substrate is scanned using a computed tomography device to provide substrate scan data. The substrate scan data is compared to substrate reference data to provide additive manufacturing data. First braze powder and second braze powder are deposited with the substrate using an additive manufacturing device based on the additive manufacturing data. The first braze powder is sintered to the substrate during the depositing of the first braze powder to provide the substrate with sintered first braze material. The powder braze material is different than the first braze powder. The second braze powder is sintered to the substrate during the depositing of the second braze powder to provide the substrate with sintered second braze material.

According to still another aspect of the present disclosure, a system is disclosed for overhauling a component comprising a substrate. This system includes a scanning device, a controller, an additive manufacturing device and a furnace. The scanning device is configured to scan the substrate using computed tomography to provide substrate scan data indicative of one or more characteristics of the substrate. The controller is configured to compare the substrate scan data to substrate reference data to provide additive manufacturing data. The additive manufacturing device is configured to deposit braze powder with the substrate based on the additive manufacturing data. The braze powder is sintered together using a laser beam during the depositing of the braze powder to provide the substrate with sintered braze material. The furnace is configured to receive the substrate and melt the sintered braze material to facilitate diffusion bonding of the sintered braze material to the substrate.

The method may also include heating the sintered first braze material and the sintered second braze material in a furnace to melt the sintered first braze material and the sintered second braze material and to diffusion bond the sintered first braze material and the sintered second braze material to the substrate.

The additive manufacturing device may include a first reservoir, a second reservoir and a nozzle. The first braze powder may be directed from the first reservoir, through the nozzle, to the substrate during the depositing of the first braze powder. The second braze powder may be directed from the second reservoir, through the nozzle, to the substrate during the depositing of the second braze powder.

The sintered first braze material may fill a void in the substrate. The sintered second braze material may form a cladding over the substrate and the first braze material.

The substrate reference data may be or otherwise include data from a design specification for the component.

The braze powder may be deposited with the substrate to fill a void in the substrate.

The method may also include: depositing second braze powder with the substrate to form a cladding on the substrate based on the additive manufacturing data, the second braze powder different than the braze powder and the second braze powder sintered together during the depositing of the second braze powder to provide the substrate with sintered second braze material; and heating the sintered second braze material to melt the sintered second braze material and to diffusion bond the sintered second braze material to the substrate.

The cladding of the sintered second braze material may cover the void filled with the sintered braze material.

The braze powder may include metal alloy powder and braze material powder with a lower melting point than the metal alloy powder.

The braze powder may have a first ratio of the metal alloy powder to the braze material powder. The second braze powder may include the metal alloy powder and the braze material powder. The second braze powder may have a second ratio of the metal alloy powder to the braze material powder. The second ratio may be greater than the first ratio.

The braze powder may be deposited with the substrate to form a cladding on the substrate.

The method may also include: depositing second braze powder with the substrate based on the additive manufacturing data, the second braze powder different than the braze powder and the second braze powder sintered together during the depositing of the second braze powder to provide the substrate with sintered second braze material; and heating the sintered second braze material to melt the sintered second braze material and to diffusion bond the sintered second braze material to the substrate.

The braze powder may be deposited with the substrate to repair a first type of defect of the substrate. The second braze powder may be deposited with the substrate to repair a second type of defect of the substrate that is different than the first type of defect.

The braze powder may include metal alloy powder and braze material powder with a lower melting point than the metal alloy powder. The braze powder may have a first ratio of the metal alloy powder to the braze material powder. The second braze powder may include the metal alloy powder and the braze material powder. The second braze powder may have a second ratio of the metal alloy powder to the braze material powder. The second ratio may be different than the first ratio.

The depositing of the braze powder may include: directing the braze powder towards the substrate through a nozzle; and sintering the braze powder using a laser beam.

The depositing of the second braze powder may include: directing the second braze powder towards the substrate through the nozzle; and sintering the second braze powder using the laser beam.

The method may also include: selectively directing the braze powder from a first reservoir to the nozzle during the depositing of the braze powder; and selectively directing the second braze powder from a second reservoir to the nozzle during the depositing of the second braze powder.

The braze powder may include metal alloy powder and braze material powder with a lower melting point than the metal alloy powder. The metal alloy powder and the substrate may be configured from or otherwise include a common metal alloy.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
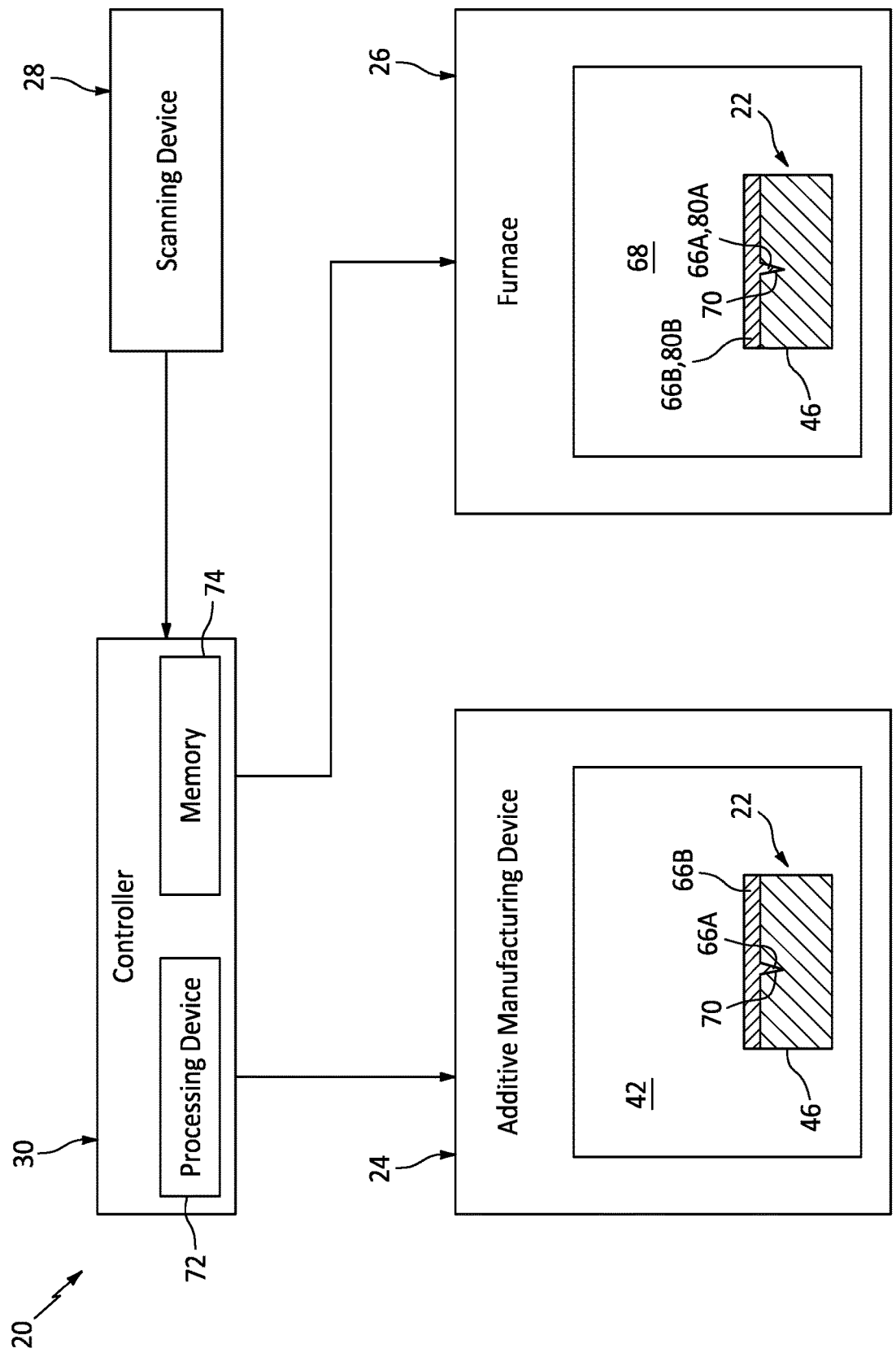
FIG. 1 is a schematic illustration of a system for adaptively manufacturing a component.

The present disclosure includes systems and methods for adaptively manufacturing or otherwise providing a component. Herein, the term "manufacturing" may describe a process for forming the component; e.g., creating a brand new component. The term "manufacturing" may also or alternatively describe a process for overhauling (e.g., repairing) the component; e.g., restoring one or more features of a previously formed component to brand new condition, similar to brand new condition or better than brand new condition. The component, for example, may be overhauled to fix one or more defects (e.g., cracks, wear and/or other damage) imparted during previous use of the component. The component may also or alternatively be overhauled to fix one or more defects imparted during the initial formation of the component. For ease of description, however, the manufacturing systems and methods may be described below with respect to overhauling the component.

The component may be any stationary component within a hot section of the gas turbine engine; e.g., a combustor section, a turbine section or an exhaust section. Examples of the stationary component include, but are not limited to, a vane, a platform, a gas path wall, a liner and a shroud. The present disclosure, however, is not limited to stationary component applications. The engine component, for example, may alternatively be a rotor blade; e.g., a turbine blade. The present disclosure is also not limited to hot section engine components. For ease of description, however, the manufacturing systems and methods may be described below with respect to overhauling a gas turbine engine component such as a turbine vane or other stators within the turbine section.

The component may be included in various gas turbine engines. The component, for example, may be included in a geared gas turbine engine where a gear train connects one or more shafts to one or more rotors in a fan section, a compressor section and/or any other engine section. Alternatively, the component may be included in a direct-drive gas turbine engine configured without a gear train. The component may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, it is contemplated the manufacturing systems and methods of the present disclosure may alternatively be used to manufacture component(s) for non-gas turbine engine applications; e.g., for reciprocating piston internal combustion engine applications, for rotary internal combustion engine applications, etc.

FIG. 1 schematically illustrates an exemplary system 20 for manufacturing (e.g., overhauling or forming) the component 22. This manufacturing system 20 includes an automated additive manufacturing (AM) device 24 (e.g., a three-dimensional (3D) printer), a furnace 26 and a scanning device 28. The manufacturing system 20 of FIG. 1 also includes a controller 30 in signal communication (e.g., hardwired and/or wirelessly coupled) with any one or more or all of the other manufacturing system components 24, 26 and 28.

Figure 2:
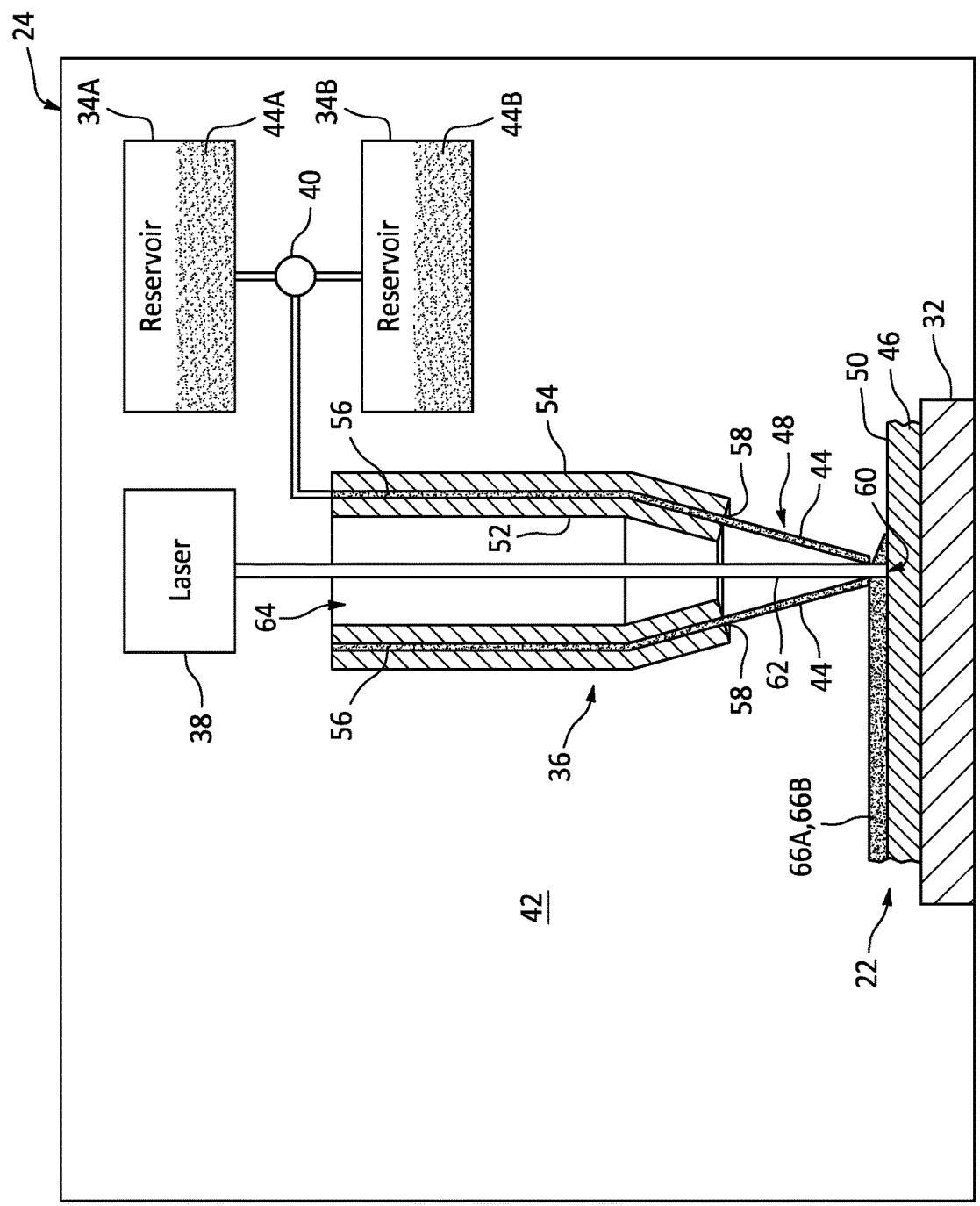
FIG. 2 is a schematic illustration of an additive manufacturing device.

Referring to FIG. 2, the additive manufacturing device 24 may be configured as a laser material deposition device. More particularly, the additive manufacturing device 24 may be configured as a direct laser braze cladding (DLBC) device. The additive manufacturing device 24 of FIG. 2, for example, includes a component support 32, one or more material reservoirs 34A and 34B (generally referred to as "34"), at least (or only) one nozzle 36, and at least (or only) one laser 38. The additive manufacturing device 24 of FIG. 2 also includes a material regulation device 40.

The component support 32 is located within an internal build chamber 42 of the additive manufacturing device 24. This component support 32 is configured to support the component 22 within the build chamber 42. The component 22, for example, may be placed on top of the component support 32. The component 22 may also or alternatively be mounted to the component support 32 via a fixture, which fixture may arrange the component 22 in a fixed position and/or in a known spatial orientation within the build chamber 42.

The first material reservoir 34A is configured to store a quantity of first braze powder 44A formed from first braze material. This first material reservoir 34A is also configured to supply the first braze powder 44A to the nozzle 36 (e.g., through the material regulation device 40) during select additive manufacturing device operations. Examples of the first material reservoir 34A include, but are not limited to, a tank, a hopper and a bin.

The second material reservoir 34B is configured to store a quantity of second braze powder 44B formed from second braze material. This second material reservoir 34B is also configured to supply the second braze powder 44B to the nozzle 36 (e.g., through the material regulation device 40) during select additive manufacturing device operations. Examples of the second material reservoir 34B include, but are not limited to, a tank, a hopper and a bin.

The material regulation device 40 is fluidly coupled with and between the material reservoirs 34 and the nozzle 36. The material regulation device 40 is configured to selectively direct the first braze powder 44A from the first material reservoir 34A to the nozzle 36 during a first mode. The material regulation device 40 is configured to selectively direct the second braze powder 44B from the second material reservoir 34B to the nozzle 36 during a second mode. The material regulation device 40 may also (or may not) be configured to selectively direct one or more combinations of the first braze powder 44A from the first material reservoir 34A and the second braze powder 44B from the second material reservoir 34B to the nozzle 36 during a third mode. Examples of the material regulation device 40 include, but are not limited to, a valve or valves, a pump or pumps, an auger or augers, and a powder metering wheel or wheels.

The nozzle 36 is configured to deliver the first braze powder 44A received from the first material reservoir 34A, the second braze powder 44B received from the second material reservoir 34B or a combination of the first braze powder 44A and the second braze powder 44B to a substrate 46 of the component 22 during additive manufacturing device operation. More particularly, the nozzle 36 is configured to direct a (e.g., annular, conical) stream 48 of the braze powder 44A and/or 44B (generally referred to as "44") toward (e.g., to) a surface 50 of the substrate 46. The nozzle 36 of FIG. 2, for example, includes a tubular inner sidewall 52 and a tubular outer sidewall 54. The outer sidewall 54 extends axially along and circumscribes the inner sidewall 52 so as to form a passage 56 (e.g., an annulus) between the inner sidewall 52 and the outer sidewall 54. This passage 56 is fluidly coupled with outlets from the material reservoirs 34 through the material regulation device 40, and the passage 56 extends axially within the nozzle 36 to a (e.g., annular) nozzle orifice 58. A distal end portion of the nozzle 36 and its inner sidewall 52 and its outer sidewall 54 may radially taper inwards as the nozzle 36 extends axially toward (e.g., to) the nozzle orifice 58. With such an arrangement, the nozzle 36 may focus the braze powder 44 to, around or about a target point 60 on, slightly above or slightly below the substrate surface 50. However, in alternative embodiments, the nozzle 36 may be configured to deliver the braze powder 44 through an internal bore rather than an annulus.

The laser 38 is configured to generate a laser beam 62 for sintering the braze powder 44 delivered by the nozzle 36 together and to the substrate 46. Herein, the term "sintering" may describe a process for coalescing powder particles together into a (e.g., porous) mass by heating without (e.g., partial or complete) liquification of the powder. This is in contrast to, for example, a powder laser welding process where powder is melted to a liquid state (e.g., in a melt pool) by a laser beam and then solidified as a solid mass. The laser 38 of FIG. 2 is configured to direct the laser beam 62 to or about the target point 60, where the laser beam 62 may be incident with and is operable to heat up the braze powder 44 for sintering. The laser beam 62 of FIG. 2 is directed through an (e.g., central) internal bore 64 of the nozzle 36, which internal nozzle bore 64 may be formed by the inner sidewall 52. However, in other embodiments, the laser 38 may be configured to direct the laser beam 62 outside of the nozzle 36 or along another path through the nozzle 36.

The additive manufacturing device 24 may also include a system for cleaning up and/or reclaiming unused powder within the build chamber 42. This cleaning/reclamation system, in particular, may clean up (e.g., dust off) excess, un-used braze powder 44A, 44B which has not been sintered by the laser beam 62. The cleaning may prevent cross-contamination between the braze powders 44A and 44B. The cleaning may also or alternatively prevent inadvertent sintering of excess braze powder 44 during an iterative layer-by-layer build process. The braze powder 44 removed from the build chamber 42 may subsequently be reclaimed for later use; e.g., returned to its respective reservoir 34. Of course, the different braze powders 44A and 44B may also or alternatively be utilized in different build chambers 42.

Referring to FIG. 1, the furnace 26 is configured to receive the substrate 46 with the sintered first braze material 66A and/or the sintered second braze material 66B (generally referred to as "66") within an internal treatment chamber 68 of the furnace 26. The furnace 26 is further configured to subject the substrate 46 and the sintered braze material(s) 66 to a heat cycle, for example under vacuum and/or in a partial pressure inert gas (e.g., argon (Ar) gas) environment. During this heat cycle, the sintered braze material(s) 66 may melt and diffusion bond to the substrate 46. An example of the furnace 26 is a vacuum furnace.

The scanning device 28 of FIG. 1 is configured to map a surface geometry of, one or more dimensions of and/or one or more spatial coordinates for a portion (or multiple portions) of or an entirety of an exterior of the component 22. Briefly, the term "map" may describe a process of determining (e.g., measuring) and collecting certain information. The scanning device 28 may also be configured to map a geometry of, one or more dimensions of and/or one or more spatial coordinates for a feature (or multiple features) in the component 22; e.g., a void 70 such as, but not limited to, a crack, a fracture, a slice, a gouge, a dimple, etc. The scanning device 28 of FIG. 1, in particular, is configured as a computed tomography (CT) device, also sometimes referred to as a computed tomography (CT) imaging device. This scanning device 28 may particularly be useful in mapping relatively small feature(s) and/or otherwise obscured feature(s) in the component 22 which may be invisible or relatively concealed from the exterior of the component 22.

The controller 30 may be implemented with a combination of hardware and software. The hardware may include at least one processing device 72 and a memory 74, which processing device 72 may include one or more single-core and/or multi-core processors. The hardware may also or alternatively include analog and/or digital circuitry other than that described above.

The memory 74 is configured to store software (e.g., program instructions) for execution by the processing device 72, which software execution may control and/or facilitate performance of one or more operations such as those described below. The memory 74 may be a non-transitory computer readable medium. For example, the memory 74 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3:
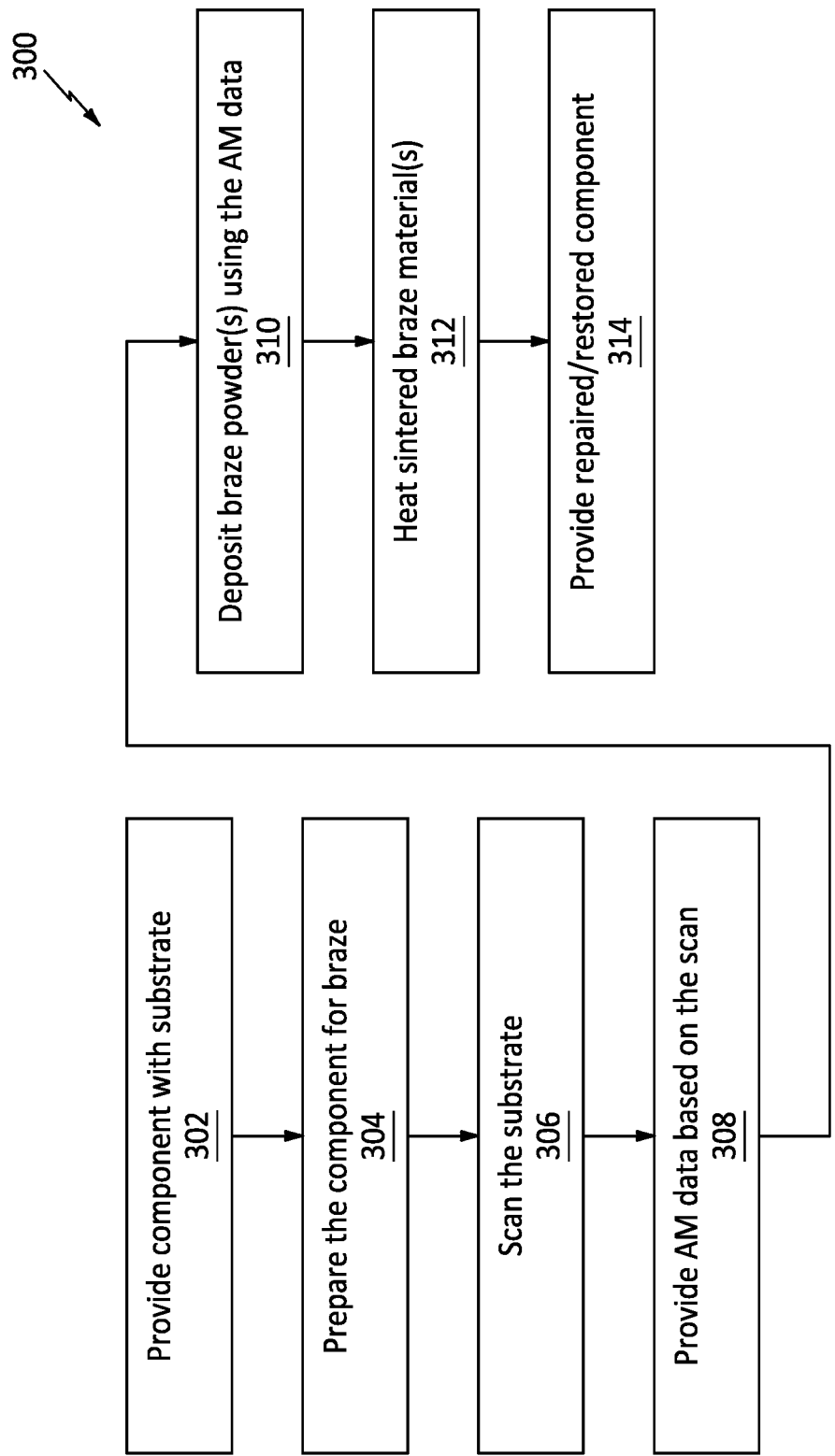
FIG. 3 is a flow diagram of an adaptive method for manufacturing the component.

FIG. 3 is a flow diagram of an exemplary adaptive method 300 for manufacturing (e.g., overhauling or forming) the component 22. For ease of description, the manufacturing method 300 is described with respect to the manufacturing system 20 and overhauling the component 22. The manufacturing method 300, however, is not limited to any particular manufacturing system types or configurations. Furthermore, some or all of the method steps may alternatively be performed to form a new component.

Figure 4:
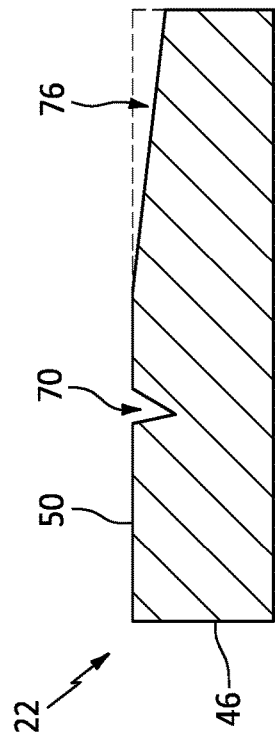
FIGS. 4-9 are partial sectional illustrations of the component during various steps of the adaptive manufacturing method.

In step 302, referring to FIG. 4, the substrate 46 is provided. For ease of description, this substrate 46 is described as part of a damaged component; e.g., a worn and/or cracked component previously installed within an engine. For example, the component 22 of FIG. 4 includes at least one void 70. This void 70 projects partially into the component 22 and its substrate 46 from the exterior of the component 22. The component 22 of FIG. 4 also includes a wear region 76 where a portion of the component 22 and its substrate 46 has been worn away due to, for example, erosion, rubbing and/or otherwise. Of course, in other embodiments, the component 22 may include multiple voids 70, multiple wear regions 76, the void(s) 70 without any wear region, the wear region(s) 76 without any void, and/or one or more other substrate defects.

Figure 5:
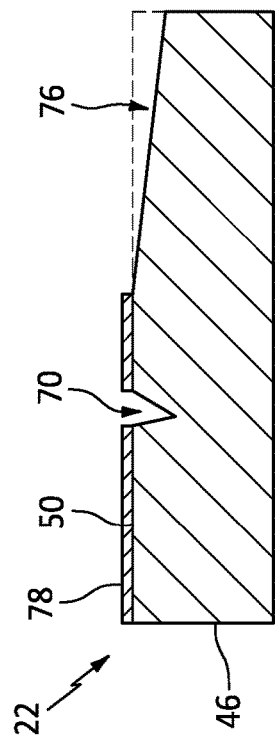

In step 304, referring to FIG. 5, the component 22 is prepared for the braze powder(s) 44. A coating 78 (see FIG. 4) over at least a portion or an entirety of the substrate 46, for example, may be removed to expose the underlying substrate 46 and its substrate surface 50. The coating 78 may be removed using various techniques such as, but not limited to, chemical stripping, abrasive blasting, waterjet blasting and/or machining. In addition or alternatively, the void 70 may be machined (e.g., enlarged, smoothed, etc.), cleaned out and/or otherwise processed.

In step 306, the substrate 46 is scanned using computed tomography (CT). The scanning device 28 of FIG. 1, for example, scans the substrate 46 of FIG. 5 to map one or more exterior characteristics of the substrate 46 and/or one or more interior characteristic of the substrate 46. Examples of the exterior substrate characteristics include, but are not limited to, a surface geometry of, one or more dimensions of and/or one or more spatial coordinates for a portion (or multiple portions) of or an entirety of an exterior of the substrate 46. Examples of the interior substrate characteristics include, but are not limited to, a geometry of, one or more dimensions of and/or one or more spatial coordinates for a feature (or multiple features) within the substrate 46 or projecting into the substrate 46; e.g., the void 70. The scanning device 28 then provides substrate scan data to the controller 30 indicative of the one or more mapped substrate characteristics. The scan data may be in the form of a computer aided design (CAD) model file; e.g., a CATIA™ model file.

In step 308, the substrate scan data is processed to provide additive manufacturing (AM) data. The controller 30 of FIG. 1, for example, may compare (e.g., align) the one or more mapped substrate characteristics from the substrate scan data with respective characteristics from substrate reference data. This substrate reference data may be data input from (or derived from) a (e.g., original equipment manufacturer (OEM)) design specification for the component 22. In other words, the controller 30 may compare the one or more mapped characteristics for the substrate 46 being worked on (e.g., repaired) to one or more corresponding characteristics of a (e.g., theoretical) design space component; e.g., a component formed according to the design specification. The controller 30, for example, may generate a solid model of the scanned substrate 46 to compare to a solid model of the design space component. The controller 30 may thereby evaluate the current state/condition of the substrate 46, and determine what additive operations may be performed (e.g., select which braze powder(s) to deposit, determine amounts of the braze powder(s) to deposit, determine where to deposit the braze powder(s), determine path(s) to follow for the depositing of the braze powder(s), etc.) to place the substrate 46 of FIG. 5 into like new (or new) condition; e.g., to have the same (or similar) characteristics as the design space component. For example, the controller 30 may identify material deficits between the solid model of the scanned substrate 46 and the solid model of the design space component, and determine how to fill those material deficits with the braze powder(s). The additive manufacturing data may include one or more commands for the additive manufacturing device 24 to place the substrate 46 of FIG. 5 into the like new (or new) condition.

Figure 6:
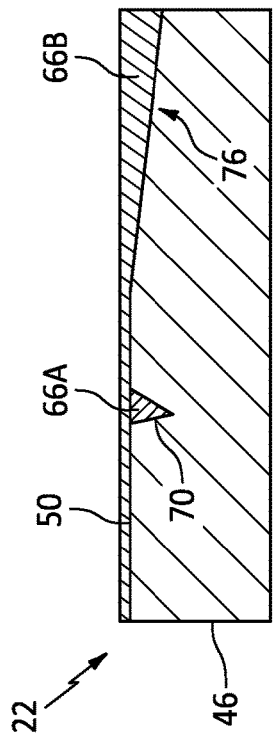
Figure 7:
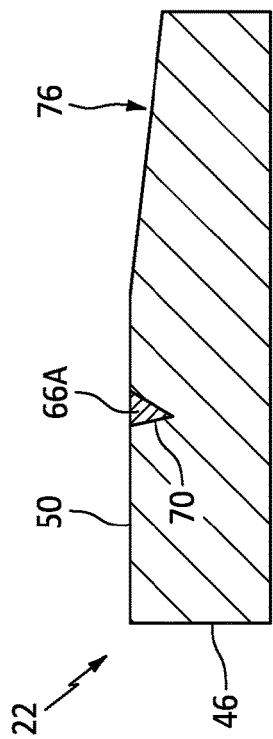

In step 310, referring to FIGS. 2, 6 and 7, the first braze powder and/or the second braze powder are selectively deposited with the substrate 46 using the additive manufacturing device 24. The first braze powder and/or the second braze powder are selectively deposited based on/according to the additive manufacturing data; e.g., command(s) provided by the controller 30.

The first braze powder 44A may be deposited with the substrate 46 to repair a first type of substrate defect such as, but not limited to, the void 70 in the substrate 46 of FIG. 6. The second braze powder 44B, by contrast, may be deposited with the substrate 46 to repair a second type of substrate defect (different than the first type of substrate defect) such as, but not limited to, the wear region 76 of FIG. 7. More particularly, the first braze powder 44A may be provided (e.g., selected, formulated, etc.) for increased wettability and/or capillary penetration. The first braze powder may thereby be particularly suited for entering and filling voids; e.g., see FIG. 6. The second braze powder 44B, on the other hand, may be provided (e.g., selected, formulated, etc.) for improved dimensional repair of the surface due to lower wettability. The second braze powder may thereby be particularly suited for forming claddings; e.g., see FIG. 7. Of course, it is contemplated the first braze powder 44A and the second braze powder 44B may be mixed together in some proportion to provide a combined braze powder with intermediate braze properties.

The first braze powder 44A may include a mixture of metal alloy powder (e.g., substrate powder) and braze material powder. The metal alloy powder may be selected to have a relatively high melting point and common (the same) or similar material properties as the substrate 46. The metal alloy powder, for example, may be made from a common (or a similar) material as the underlying substrate 46; e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may include a common or similar base element as the substrate 46 and/or the metal alloy powder (e.g., aluminum (Al), nickel (Ni) or titanium (Ti)) without the super alloying elements. The brazing powder may also include boron (B), silicon (Si) and/or other melting point suppressants which may help facilitate melting and diffusion of the metal alloy powder with the substrate 46. The present disclosure, however, is not limited to the foregoing exemplary braze materials.

The second braze powder 44B may include a mixture of the metal alloy powder (e.g., substrate powder) and the braze material powder. A ratio of the metal alloy powder to the braze material powder in the second braze powder 44B may be greater than a ratio of the metal alloy powder to the braze material powder in the first braze powder 44A. For example, the second braze powder 44B may include higher proportions of the metal alloy powder relative to the braze material powder (e.g., 70/30). By contrast, the first braze powder 44A may include lower proportions of the metal alloy powder relative to the braze material powder (e.g., 60/40). The present disclosure, however, is not limited to the foregoing exemplary braze powder makeups. For example, in other embodiments, one or more or all of the constituent materials in the first braze powder may be different that one or more or all of the constituent materials in the second braze powder.

During the braze powder deposition, the additive manufacturing device 24 of FIG. 2 may deposit the respective braze powder 44 onto the substrate 46 at or about the target point 60. The laser 38 may concurrently sinter this respective braze powder 44 at the target point 60 together and/or to the underlying substrate 46. Referring to FIG. 6, the additive manufacturing device 24 may be positioned and operated to provide the sintered first braze material 66A within the void 70; e.g., to partially or completely fill the void 70. Referring to FIG. 7, the additive manufacturing device 24 may be positioned and operated to provide a cladding (e.g., a layer or multiple layers) of the sintered second braze material 66B over the wear region 76; e.g., to build back worn away substrate material. The additive manufacturing device 24 may also or alternatively be positioned and operated to provide a cladding (e.g., a layer or multiple layers) of the sintered second braze material 66B over the sintered first braze material 66A and/or one or more other (e.g., adjacent) regions of the substrate 46.

The additive manufacturing device 24 may selectively deposit the first braze powder and/or the second braze powder over the substrate 46 such that (e.g., only) areas which need repair (and optionally areas adjacent and/or surrounding those areas) are filled with the sintered first braze material 66A and/or coated with the sintered second braze material 66B. Of course, in other embodiments, the first braze powder and/or the second braze powder may be deposited over an entirety of the substrate 46 where excess material may later be removed. The first braze powder and/or the second braze powder may be deposited (e.g., built up) as one or more layers during the step 310.

Figure 8:
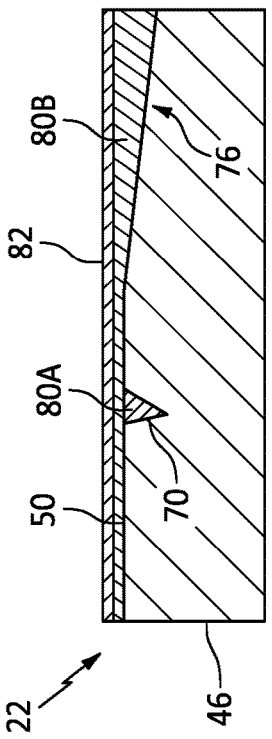

In step 312, referring to FIG. 8, the substrate 46 and the sintered braze material(s) 66 are heated. The substrate 46 with the sintered braze material(s) 66, for example, may be arranged within the treatment chamber 68 of the furnace 26 of FIG. 1. The furnace 26 may subject the substrate 46 with the sintered braze material(s) 66 to a heat cycle. More particularly, the substrate 46 with the sintered braze material(s) 66 may be heated to an elevated temperature within a partial pressure inert gas environment. The elevated temperature is selected such that the sintered braze material(s) 66 melt and flows into defects of the substrate 42 by capillary action. Once the sintered braze material has melted, a relatively lower temperature may be selected and held in the same heat cycle for a duration. This sustained temperature may facilitate diffusion of the melting point suppressant material. This diffusion of the melting point suppressant material may facilitate athermal solidification, resulting in a braze diffusion bond of the sintered material to the substrate 42. The athermal solidification may describe solidification of the melted sintered braze material under, for example, a constant temperature. The diffusion duration may be between four (4) hours and twelve (12) hours, but may be much shorter or longer depending on materials being diffusion brazed and/or desired material properties. This elevated temperature, however, is less than a melting point temperature of the substrate material. The elevated temperature for the braze melt, for example, may be between 1,500° F. and 2,500° F. The elevated temperature for the braze diffusion, for example, may be between 1,000° F. and 2,400° F. The inert gas environment may have a vacuum pressure range between, for example, 0.5 microns and 0.1 microns. The present disclosure, however, is not limited to the foregoing exemplary heat cycle parameters, and the foregoing heat cycle parameters may vary depending upon the specific material composition of the substrate 46 and the braze material, dimensions (e.g., thickness) of the sintered braze material(s) 66, etc.

Following the heating step 312, first braze filler material 80A (e.g., the melted and diffusion bonded first braze material) of FIG. 8 may heal the void 70. The first braze filler material 80A, for example, may partially or completely fill the void 70. Second braze filler material 80B (e.g., melted and diffusion bonded second braze material) may provide a cladding over the substrate 46 to restore a dimensional parameter of and/or reinforce the wear region 76 and/or other regions. The second braze filler material 80B, for example, may buildup the wear region 76 back to or above a dimensional parameter specified therefor by a design specification or an overhaul repair specification for the component 22.

Figure 9:
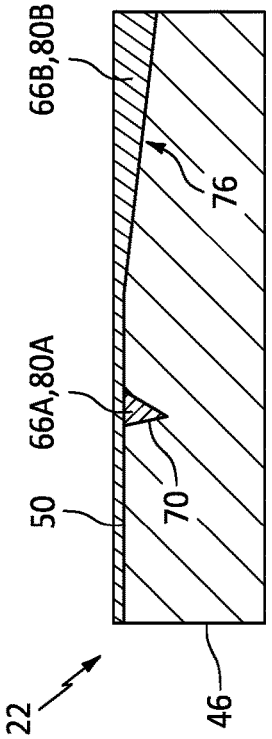

In step 314, referring to FIG. 9, the substrate 46 with the braze filler material(s) 80A and 80B (generally referred to as "80") may be processed (e.g., post-braze processed) to provide an overhauled/restored component. Excess braze filler material(s), for example, may be removed, the substrate material and/or the braze filler material(s) may be finished (e.g., sanded, polished, etc.), and/or one or more coatings 82 (e.g., bond coating(s), environmental coating(s), thermal barrier coating(s), etc.) may be applied to the substrate 46 and/or the braze filler material(s) 80.

In some embodiments, referring to FIG. 2, the respective braze powder 44 and the laser beam 62 may be concurrently directed to the common target point 60 for the braze material deposition. In other embodiments, however, the laser beam 62 may alternatively be directed to a different target point than the respective braze powder 44. The laser beam target point, for example, may alternatively be spaced from and follow the braze powder target point.

In some embodiments, the respective braze powder 44 may be sintered using the laser beam 62. The present disclosure, however, is not limited to use of such an exemplary energy beam. The respective braze powder 44, for example, may alternatively be sintered using an electron beam provided by an electron beam source. Furthermore, multiple energy beams (e.g., laser beams and/or electron beams) may be used for sintering the respective braze powder 44. In addition or alternatively, multiple nozzles 36 may be used to deliver the braze powders 44.

A component manufactured using a typical additive laser deposition welding process may be subject to: internal stresses thermally induced by relatively high welding temperatures (e.g., temperatures high enough to melt the substrate material); thermally induced distortion and/or warping; and/or reduction in material density caused by, for example, dendritic voids. By contrast, sintering the braze powder(s) 44A and/or 44B with the substrate 46 and then diffusion bonding the braze material(s) with the substrate 46 as described above subjects the substrate 46 to relatively low processing temperatures, compared to welding temperatures. The manufacturing methods of the present disclosure may thereby reduce or eliminate: thermally induced stresses; thermally induced distortion and/or warping; and/or reduction in material density associated with additive laser deposition welding techniques. The above laser braze cladding technique is also paired with the adaptive processing to reduce material consumption and/or require less post processing (e.g., machining, finishing, etc.) compared to traditional manual brazing techniques.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for providing a component, comprising:
   scanning a substrate using computed tomography to provide substrate scan data;
   comparing the substrate scan data to substrate reference data to provide additive manufacturing data;
   depositing braze powder with the substrate based on the additive manufacturing data, the braze powder sintered together during the depositing of the braze powder to provide the substrate with sintered braze material; and
   heating the sintered braze material to melt the sintered braze material and diffusion bond the sintered braze material to the substrate.

2. The method of claim 1, wherein the substrate reference data comprises data from a design specification for the component.

3. The method of claim 1, wherein the braze powder is deposited with the substrate to fill a void in the substrate.

4. The method of claim 3, further comprising:
   depositing second braze powder with the substrate to form a cladding on the substrate based on the additive manufacturing data, the second braze powder different than the braze powder and the second braze powder sintered together during the depositing of the second braze powder to provide the substrate with sintered second braze material; and
   heating the sintered second braze material to melt the sintered second braze material and diffusion bond the second braze material to the substrate.

5. The method of claim 4, wherein the cladding covers the void that was filled with the braze powder.

6. The method of claim 4, wherein the braze powder comprises metal alloy powder and braze material powder with a lower melting point than the metal alloy powder.

7. The method of claim 6, wherein
   the braze powder has a first ratio of the metal alloy powder to the braze material powder; and
   the second braze powder comprises the metal alloy powder and the braze material powder, the second braze powder has a second ratio of the metal alloy powder to the braze material powder, and the second ratio is greater than the first ratio.

8. The method of claim 1, wherein the braze powder is deposited with the substrate to form a cladding on the substrate.

9. The method of claim 1, further comprising:
   depositing second braze powder with the substrate based on the additive manufacturing data, the second braze powder different than the braze powder and the second braze powder sintered together during the depositing of the second braze powder to provide the substrate with sintered second braze material; and
   heating the sintered second braze material to melt the sintered second braze material and diffusion bond the sintered second braze material to the substrate.

10. The method of claim 9, wherein
    the braze powder is deposited with the substrate to repair a first type of defect of the substrate; and
    the second braze powder is deposited with the substrate to repair a second type of defect of the substrate that is different than the first type of defect.

11. The method of claim 9, wherein
    the braze powder comprises metal alloy powder and braze material powder with a lower melting point than the metal alloy powder, and the braze powder has a first ratio of the metal alloy powder to the braze material powder; and
    the second braze powder comprises the metal alloy powder and the braze material powder, the second braze powder has a second ratio of the metal alloy powder to the braze material powder, and the second ratio is different than the first ratio.

12. The method of claim 9, wherein the depositing of the braze powder includes
    directing the braze powder towards the substrate through a nozzle; and
    sintering the braze powder using a laser beam.

13. The method of claim 12, wherein the depositing of the second braze powder includes
    directing the second braze powder towards the substrate through the nozzle; and
    sintering the second braze powder using the laser beam.

14. The method of claim 13, further comprising:
    selectively directing the braze powder from a first reservoir to the nozzle during the depositing of the braze powder; and
    selectively directing the second braze powder from a second reservoir to the nozzle during the depositing of the second braze powder.

15. The method of claim 1, wherein
    the braze powder comprises metal alloy powder and braze material powder with a lower melting point than the metal alloy powder; and
    the metal alloy powder and the substrate comprise a common metal alloy.

16. A method for providing a component, comprising:
    scanning a substrate using a computed tomography device to provide substrate scan data;
    comparing the substrate scan data to substrate reference data to provide additive manufacturing data; and
    depositing first braze powder and second braze powder with the substrate using an additive manufacturing device based on the additive manufacturing data, the first braze powder sintered to the substrate during the depositing of the first braze powder to provide the substrate with sintered first braze material, and the second braze powder different than the first braze powder and the second braze powder sintered to the substrate during the depositing of the second braze powder to provide the substrate with sintered second braze material.

17. The method of claim 16, further comprising heating the sintered first braze material and the sintered second braze material in a furnace to melt the sintered first braze material and the sintered second braze material and to diffusion bond the sintered first braze material and the sintered second braze material to the substrate.

18. The method of claim 16, wherein
the additive manufacturing device includes a first reservoir, a second reservoir and a nozzle;
the first braze powder is directed from the first reservoir, through the nozzle, to the substrate during the depositing of the first braze powder; and
the second braze powder is directed from the second reservoir, through the nozzle, to the substrate during the depositing of the second braze powder.

19. The method of claim 16, wherein
the sintered first braze material fills a void in the substrate; and
the sintered second braze material forms a cladding over the substrate and the sintered first braze material.

20. A system for overhauling a component comprising a substrate, the system comprising:
a scanning device configured to scan the substrate using computed tomography to provide substrate scan data indicative of one or more characteristics of the substrate;
a controller configured to compare the substrate scan data to substrate reference data to provide additive manufacturing data;
an additive manufacturing device configured to deposit braze powder with the substrate based on the additive manufacturing data, the braze powder sintered together using a laser beam during the depositing of the braze powder to provide the substrate with sintered braze material; and
a furnace configured to receive the substrate and melt the sintered braze material to facilitate diffusion bonding of the sintered braze material to the substrate.

* * * * *